UNITED STATES PATENT OFFICE.

DAVID BACHRACH, OF BALTIMORE, MARYLAND.

NITROCELLULOSE OR SIMILAR SUBSTANCE AND PROCESS OF MAKING SAME.

SPECIFICATION forming part of Letters Patent No. 667,759, dated February 12, 1901.

Application filed October 5, 1900. Serial No. 32,194. (No specimens.)

*To all whom it may concern:*

Be it known that I, DAVID BACHRACH, a citizen of the United States, residing at the city of Baltimore, in the State of Maryland, have invented certain new and useful Improvements in Nitrocellulose and Similar Substances and Processes of Making Same, fully described and represented in the following specification, forming a part of the same.

This invention relates to improvements in nitrocellulose and similar compounds and to a process of making the same, the object of the present invention being to provide a non-combustible or a very slowly combustible compound of this character which will be capable of use for the same purposes as those for which celluloid, xylonite, &c., are now used and also for other purposes for which the latter, because of their high inflammability, as now made cannot be used or at least used with safety.

The present invention is based upon the discovery made by me that if there be added to such compounds in proper quantities a suitable salt—as, for example, sulfate of lime—a chemical change is effected in the other solid and ordinarily highly inflammable constituents of such compounds which (according to the quantity of sulfate present) wholly or partially destroys their combustibility, and thus renders the compound as a whole non-combustible or only very slowly combustible and capable of use for the purposes above mentioned. For the production of a non-combustible compound of this character the sulfate present in the compound, according to my invention, must constitute forty per cent. or more (and preferably fifty per cent.) of the solid constituents of the compound, while for the production of a compound which is not absolutely non-combustible, but will burn only very slowly—like wood, for example—the quantity of sulfate present may, according to my invention, be lowered to thirty per cent. The salt used may be any suitable one formed by the addition to an antacid substance of any suitable salt-producing acid which will transform such substance into a salt; but the salt which I prefer and which I have found best adapted for the purpose is sulfate of lime formed by the addition to carbonate or oxid of lime of sulfuric acid. The salt used also may be previously prepared and then added to the other constituents; but for reasons which will hereinafter appear I prefer to form it in the compound itself by the addition of the carbonate or oxid and the acid separately.

When the sulfate of lime is employed and it is formed in the compound itself, the procedure is as follows: To the usual quantities of pyroxylin or the like and camphor—ten parts, by weight, of the former to five parts, by weight, of the latter—employed in the manufacture of celluloid or like compounds I add ten parts or more, (and preferably fifteen parts,) by weight, of carbonate-of-lime pigment and a sufficient quantity of sulfuric acid to transform the carbonate into a sulfate, the usual solvent of pyroxylin being added, the quantity added depending upon whether the compound is to be used in a fluid or solid state. I find that the addition of the sulfuric acid makes the substance somewhat non-inflammable, while the addition of fifteen parts of the pigment also brings about a reaction which will make the product absolutely non-combustible.

The proportions above given are for the production of a compound which is absolutely non-combustible. For the production of a compound which is not absolutely non-combustible, but will only burn very slowly—like wood, for example—a much smaller quantity of carbonate of lime will suffice, as before stated.

If an acid pyroxylin be used, a less proportion of sulfuric acid will be required than where the pyroxylin is not acid. The exact amount can be determined in each case by experiment.

If the sulfate pigments be previously prepared and added direct to the other ingredients without the chemical reaction produced by the admixture separately with the other constituents of the carbonate and acid, as described, a non-inflammable substance will also be produced; but in this case a much larger proportion of sulfate will be required, which will deprive the product of some of its flexibility desirable for certain purposes, the quantity of sulfate required in such case being sixty per cent. or more, by weight, of the solid constituents of the product to make it non-inflammable. I have found that somewhat similar results are produced by the use of other pigments, such as phosphate of lime or any pigment or salt that is changed by reaction in the compound to a sulfate or salt corresponding to the acid used in the addition. It is this reaction in the compound itself and the large proportions herein given that produce the property of non-inflammability which is the subject of my invention.

What I claim is—

1. A nitrocellulose or similar compound containing a sulfate constituting thirty per cent. or more by weight of the solid constituents of the compound.

2. The process of forming a non-combustible cellulose or similar compound which consists in adding to the other constituents thereof carbonate of lime in about the proportions specified, and sulfuric acid.

3. The process of forming a cellulose or similar compound of the character described which consists in adding to the other constituents thereof an antacid substance and a salt-producing acid in about the proportions specified.

In testimony whereof I have hereunto set my hand in the presence of two subscribing witnesses.

DAVID BACHRACH.

Witnesses:
NELLIE HANNA,
ARCHIE J. WILLIAMS.